July 10, 1934.  R. F. ANDERSON  1,965,625
WINDSHIELD FOR AUTOMOBILES
Filed May 22, 1933   2 Sheets-Sheet 1
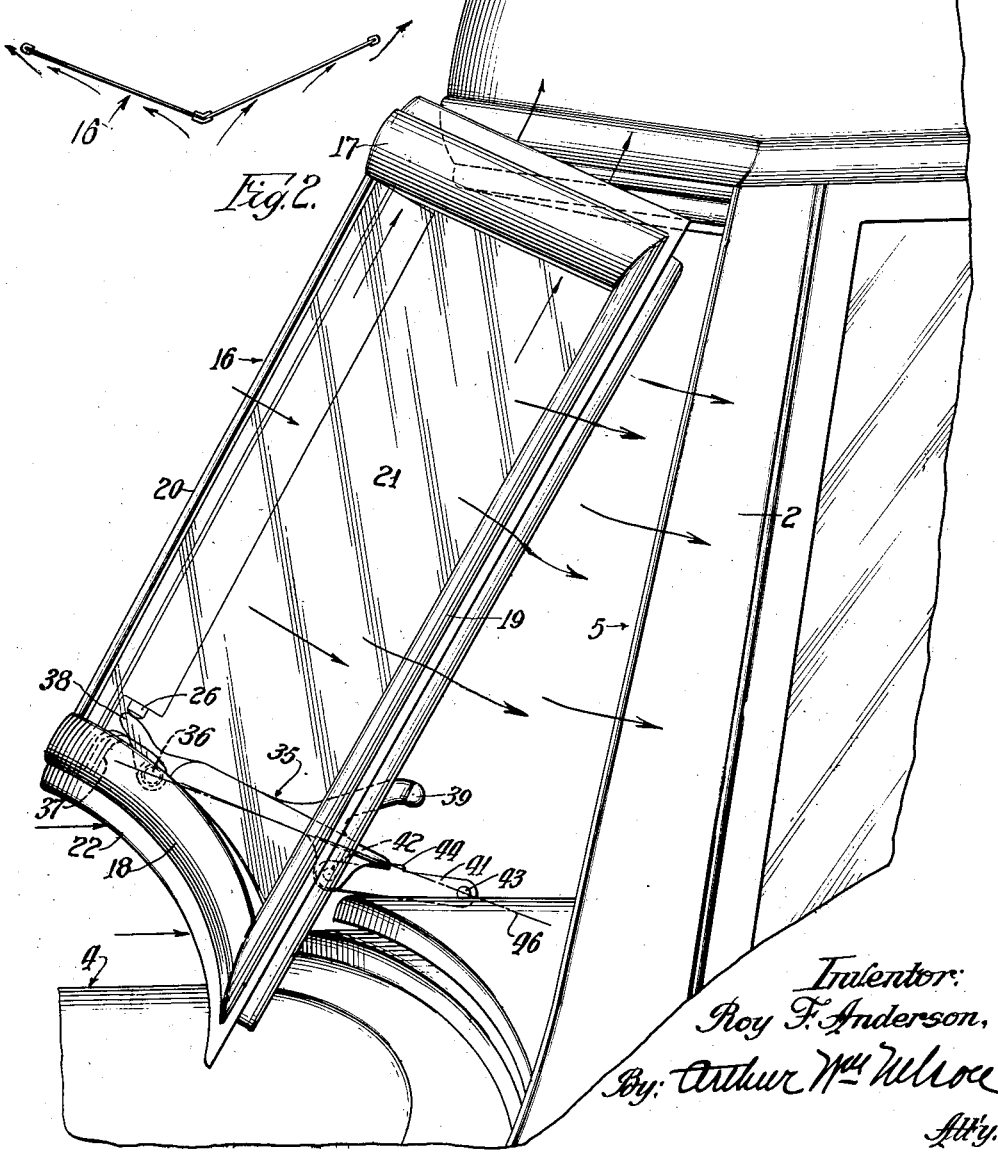

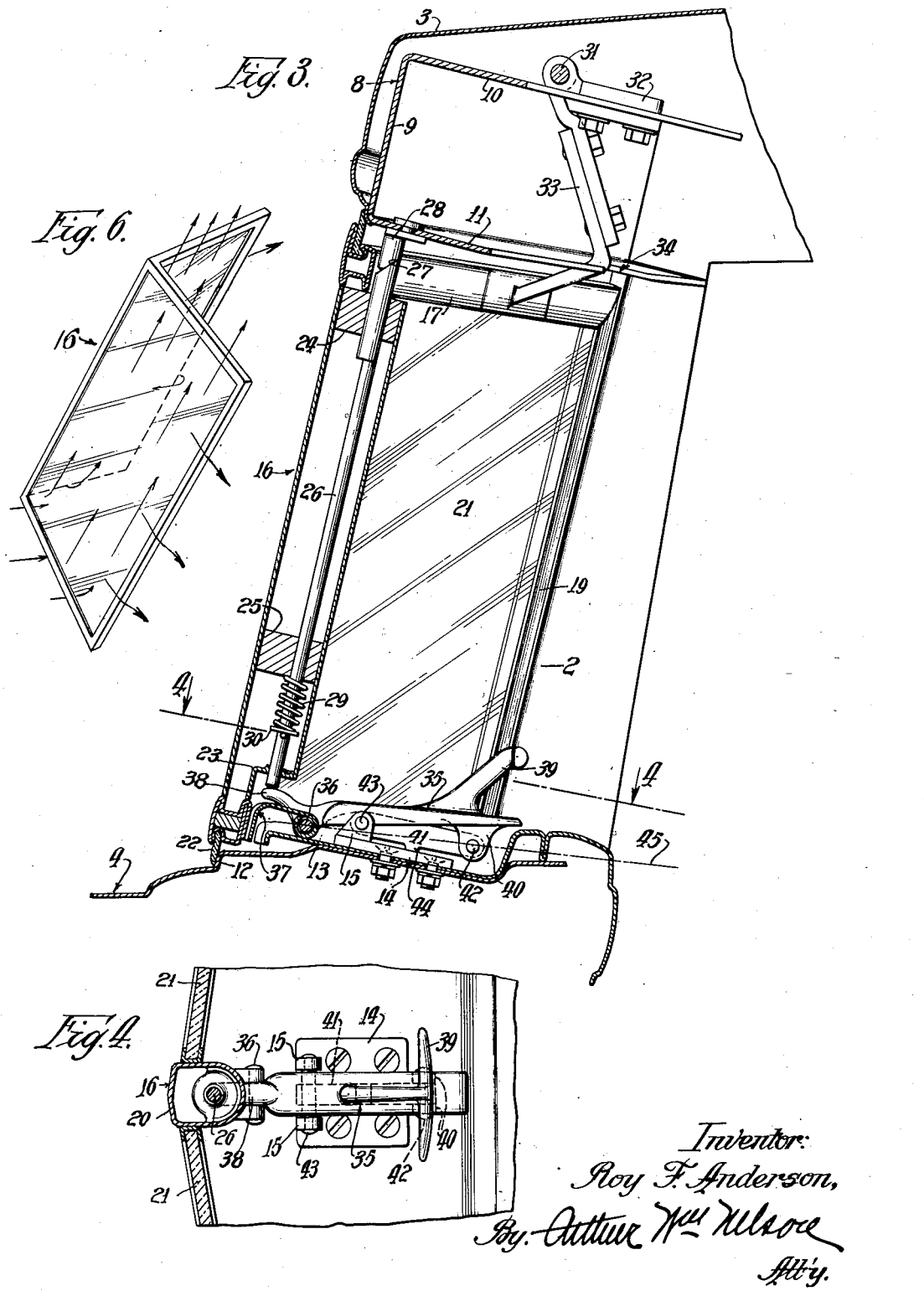

Patented July 10, 1934

1,965,625

UNITED STATES PATENT OFFICE 1,965,625

WINDSHIELD FOR AUTOMOBILES

Roy F. Anderson, Auburn, Ind., assignor to Manning & Co., Chicago, Ill., a corporation of Illinois Application May 22, 1933, Serial No. 672,242

6 Claims. (Cl. 296—84)

This invention relates to improvements in windshields for automobiles and it consists of the matters hereinafter described and more particularly pointed out in the appended claims.

Generally, windshields as now employed upon automobiles are either of the sloping one piece type or sloping two piece V type and in both instances, the windshields have a pivotal connection at the top with the automobile body whereby they may be swung from a closed to an open position and vice versa.

The sloping windshield of either the one piece or two piece type is preferred to the vertical type of windshield heretofore used because of the absence of glare and reflections of either natural or artificial lights.

With the sloping two piece V type of windshield, the same is usually made in two laterally arranged individual sections, each of which is pivoted at the top for independent opening and closing movements. As now made, when either type of windshield is open, air enters the automobile at the bottom and sides only, so that a drafty condition is set up in the body, which is not conducive to the well being and comfort of the occupants.

One of the objects of the present invention is to provide a normally sloping windshield that may be easily opened and closed, and which when in an open position, provides effective ventilation in the body of the automobile without the drafts heretofore obtaining.

Another object of the invention is to provide a sloping V type windshield, wherein both sections thereof may be moved together as a unit from a closed to an open position, the windshield when in open position, providing draftless ventilation for the interior of the automobile body.

A further object of the invention is to provide a windshield of this kind which may be bodily moved in the general direction of the median plane of the body from one position to the other and which windshield when in its open position, is spaced at its top, bottom and side margins from the associated parts of the body, against which it normally seats or engages when in a closed position.

Still another object of the invention is to provide a windshield of this kind which when bodily moved forward into an open position, is securely held in that position against rattling and self closing under wind pressure induced by the automobile even when travelling at high speed.

The above mentioned objects of the invention as well as others, together with the many advantages thereof, will more fully appear as I proceed with my specification.

In the drawings:

Fig. 1 is a perspective view of the front end of an automobile embodying my improved windshield which is shown in its closed position;

Fig. 2 is a fragmentary view in side elevation on an enlarged scale, of the improved windshield when in its open position, as viewed from the left hand side of the automobile;

Fig. 3 is a longitudinal vertical sectional view through the improved windshield when in its closed and locked position;

Fig. 4 is a detail horizontal sectional view on an enlarged scale, through a part of the improved windshield as taken on the line 4—4 of Fig. 3;

Fig. 5 is a diagrammatic horizontal sectional view through the windshield proper and illustrates more particularly the draft action at the sides of the windshield when open; and Fig. 6 is a diagrammatic perspective view illustrating more particularly the draft action at the sides as well as at the top and bottom of the windshield when open.

In general, my improved windshield which as shown herein, is of the sloping V type, includes a rigid frame made to provide two sections that not only are inclined rearwardly from the center bar or post, but also slope upwardy and rearwardly. The top, the cowl and corner posts of the automobile body which provide the associated windshield opening, are formed to provide a seat with which rubber sealing strips on the margins of the frame snugly engage when the windshield is in its closed position.

The top edge of the frame is supported on two concealed type hinges and has an operative connection at the bottom end of the center post, with a suitable folding, toggle arm locking mechanism on the cowl. Concealed in the center bar is a lock operating rod. The top end of said rod is adapted to have engagement with a wedge block fixed with respect to the top. The bottom end of this rod is so disposed as to be actuated by the mechanism before referred to. Thus, when the said mechanism is actuated to open the windshield it first releases the lock. When said mechanism is actuated to close the windshield, it locks the same after such closing.

When the windshield is open, it is spaced around its entire margin from those parts of the body with which it is associated. When the automobile is in motion, the air impinges against the windshield, with more or less force depending upon the automobile speed. A part of the air stream is deflected laterally, another part is deflected upwardly and a third part passes under the bottom of the windshield. That part of the air passing upwardly above the top of the windshield, produces a vacuous condition behind the same, so that those parts of the air stream passing about the sides and bottom pass upwardly and out of the space between the body top and windshield at this point. This induces a forward entraining action to withdraw air from the interior of the automobile body so as to provide a draftless ventilation thereof.

Referring now in detail to that embodiment of the invention, illustrated in the drawings:

1 indicates as a whole an automobile body including side pillars 2—2, a top 3 and a cowl 4 all of which coact to provide a windshield opening 5 for the body. The front end of the top is slightly V-shaped; that is, opposite sides of the front converge forwardly from each pillar to meet on the median line of the body.

Suitably supported and following about the inside of the front end of the top is a channel member 8 including a front web 9 and top and bottom flanges 10 and 11 respectively.

The cowl 4, which as shown herein is made of sheet metal, is provided with a shoulder 12, that follows the lateral inclinations of the sides of the front of the body top but is spaced in a plane forwardly of the same. On the median line of the cowl, to the rear of the shoulder 12, is a recess 13 in which is fixed a bracket 14 having an upstanding ear 15. The purpose of these parts will soon appear.

16 indicates as a whole the sloping V-shaped windshield frame which includes top and bottom rails 17 and 18 respectively, side rails 19—19 and a center post or bar 20. The various parts of the frame mentioned are preferably fabricated from sheet metal to receive the panes of glass 21 for each side of the windshield. The top rail 17 of the windshield frame, follows the contour of the top, the bottom rail 18 follows the contour of the shoulder 12 of the cowl and the side rails are inclined in accordance with the inclination of the pillars 2. A flexible sealing strip 22 follows around the top, bottom and sides of the frame to provide a tight connection for the windshield when closed. This sealing strip also prevents metal-to-metal engagement between the windshield and associated body parts when the windshield is closed and thus avoids the generation of objectionable noises.

The center post 20 which is comparatively narrow, considered transversely, is hollow and is offset at the bottom as at 23. In said post are located top and bottom guide blocks 24—25 respectively in which a locking rod 26 has a sliding bearing. The top end of the locking rod is beveled as at 27 to engage behind the matched beveled portion of a lock block 28 carried on the underside of the flange 11 of the channel 8. The bottom end of the rod 26 extends through the offset 23 and a spring 29 surrounds the rod, between the block 25 and a washer 30 fixed on the rod. This spring normally acts to urge said rod downwardly to withdraw its beveled top end 27 from behind the block 28.

The top end of the windshield frame has a concealed, pivotally supported, suspending arm connection with respect to the body top so that in the opening movement the top rail of the windshield frame, swings upwardly and away from the shoulder 7. To provide for such a connection, transversely extending shafts 31 are mounted in suitable brackets 32 on the top flange 10 of the channel 8. These brackets are adjustable fore and aft to allow for their proper positioning during assembly. An L-shaped arm 33 is fixed at one end to each side of the frame rail 17 and is pivotally engaged at its other end on an associated shaft 31. As shown herein, this arm is made of two parts having a slot and bolt connection whereby the effective length of the arm as a whole may be accurately made for assembly purpose. The lower flange 11 of the channel is provided with recesses 34 in which a part of the arm is disposed in its movement.

The mechanism for actuating the windshield from one position to the other is operatively connected with the bottom portion of the windshield frame and includes an actuating mechanism associated with the cowl recess 13 before mentioned. Said mechanism which is of a toggle arrangement includes an actuating lever 35. The front end of said lever is pivoted at 36 to a bracket 37 extending rearwardly from the bottom end of the center post at a point below its offset 23. This front end of said lever includes an extension 38 adapted for engagement with the bottom extremity of the locking rod 26 in the center post. The other end of said lever 35 includes an upwardly and rearwardly extending handle 39 and a depending ear 40. A link 41 is pivoted at one end as at 42 to said ear 40 and is pivoted at its other end as at 43 to the ear 15 of the bracket 14. This link is provided along one edge at a point between its ends with a shoulder lug 44, that normally engages on the bracket 14 when the windshield is in its closed and locked position.

When the windshield is in its closed position, as shown in Figs. 1 and 3, an associated lever 35 and link 41 comprising the toggle actuating mechanism are in a locked off-center position. In this respect, it is to be noted that the plane (as indicated by the line 45) of the pivotal connections 36—42 for the ends of lever 35 is disposed below the pivotal connection 43 of the link 41 with the bracket ear 15. When said lever is in this position, a considerable upward pressure is exerted by its extension 38 upon the bottom end of the locking rod 26. This upward pressure on said rod causes a snug engagement between its beveled top and 27 and the block 28 so that the windshield is held firmly in its closed position to provide a quite, windproof and weatherproof engagement of the windshield with respect to the body top.

To open the windshield, the operator grasps the lever handle 39 and imparts an upward lift thereon so that said lever in the initial part of its movement swings about its pivotal connection 36. In this initial part of its movement which continues until the plane as indicated by the line 45 passes through the plane of the pivotal connections 36—43, the extension 38 moves away from the bottom end of the rod 26. During so much of the lever movement, the spring 29 operates upon the rod to move it downwardly, thus releasing its beveled top end 27 from behind the block 28 so that the windshield is unlocked.

It is to be noted that the pivot 36 is located at a point in advance of the plane of the shaft 31. Thus in the further movement of the lever, the link 41 swings upward about its pivotal connection 43 with the ear 15 into a position forming an extension of the lever 35 and the windshield frame bodily swings upwardly and away from the body parts with which it was heretofore engaged.

When the lever and link are in the extended position shown in Fig. 2, they assume another off-center locking position wherein a plane connecting the pivots 36 and 43 (as indicated by the line 46) is disposed above the plane of the pivot 42. With the parts in this position, the extreme rear end of the lever 35 is engaged in front of the shoulder lug 44 on the link 4. It is apparent that when driving with the windshield in this open position, a considerable wind pressure is imposed upon the windshield frame which would tend to move it back to a closed position. With the parts arranged as described, this pressure is made to act in a manner assisting in holding said parts in the locked open position.

When driving with the windshield in its open position, a draft action is established at each side and under the bottom thereof as best illustrated by arrows in the diagrammatic views Figs. 5 and 6. At the top edge of the windshield is now disposed a slight distance above the bottom margin of the body top, and with the windshield in its greater angular position or inclination, the front face of the windshield acts to deflect the air current over the top edge of the windshield, producing an action which pulls air through the open space or slot between the top edge of the windshield and the automobile top.

With such an action at the top edge of the windshield and with an air current, passing under the bottom of the open windshield and about its sides, as is also indicated by the arrows in Fig. 2, an updraft is caused directly behind the windshield to pass out of the opening between the top of the windshield frame and associated body top part. This updraft and top discharge produces an entraining action, in the interior of the automobile body which ventilates the same without creating a draft action within the automobile.

To close the windshield, the handle 39 is grasped and swung upwardly and rearwardly and back into the position shown in Fig. 3. In the final part of the movement of the lever, when the plane as indicated by the line 45 swings through the pivot 43, the extension 38 exerts an upward pressure on the rod. The engagement of the top end of the rod with the block 28 is such as to draw the top part of the windshield into a tightly closed position, the final part of said lever movement also acts to draw in the bottom part of the windshield so that a good tight engagement is provided between the entire margin of the frame and the automobile body top parts associated therewith.

It will be observed that when the windshield is in its closed position, it is impossible for the same to be opened from the outside. The improved windshield, when open provides a draftless ventilation afforded by the entraining action described.

The windshield because of its inclination effectively dissipates the headlight glare of oncoming automobiles so that the safety factor in operation is increased in this respect. Furthermore, it permits making the windshield in one piece and thus reduces manufacturing and assembly cost and also reduces likelihood of development of noises usually incident to a structure composed of numerous parts.

While in describing the invention, I have referred in detail to the form, arrangement and construction of the parts thereof, the same is to be considered only as illustrative of one embodiment of the invention so that I do not wish to be limited thereto except as may be specifically set forth in the appended claims.

I claim as my invention:

1. In combination with parts of an automobile body providing a windshield opening, a windshield adapted to engage upon said parts when in its closed position, a center bar included in said windshield, means carried by said center bar for locking the top of the windshield in its closed position, and means associated with the bottom part of the windshield for moving the windshield bodily into its open position, said last mentioned means operating in the initial part of its movement to actuate said locking means to unlock the top of the windshield.

2. In combination with parts of an automobile body providing a windshield opening, a windshield adapted to engage upon said parts when in a closed position, means providing a pivotal suspension for the top of the windshield, means associated with the top of the windshield for locking it in closed position, and means operatively connected to the bottom of the windshield for locking it in a closed position and for moving the windshield bodily about said suspension means from said closed position into open position, and vice versa, said last mentioned means in the initial part of its movement when actuated to open the windshield, operating said windshield top locking means for releasing the same.

3. In combination with parts of an automobile body providing a windshield opening, a one piece upwardly and rearwardly inclined, V-shaped type of windshield adapted to engage upon said parts when in a closed position, means providing a pivotal suspension for the top of the windshield, means for locking the top of the windshield when in its closed position, a foldable and extensible link and lever arrangement associated with the bottom end of said windshield for bodily moving the windshield from its open to its closed position and vice versa, said arrangement when the windshield is in its closed position operating to lock the bottom portion of the windshield in the closed position, and means operated by said arrangement when operated to bodily swing the windshield into its open position, for actuating said windshield top locking means to release the same.

4. In combination with the parts of an automobile body providing a windshield opening, a one piece upwardly and rearwardly inclined V-shaped type of windshield having marginal parts engaged with said body parts when in a closed position, means providing a center bar from said windshield, means providing a suspension arm arrangement for the windshield having a pivotal connection with said body whereby when the windshield is moved to open position, it swings bodily upward and away from said body parts to space the marginal parts of the windshield therefrom, means associated with the center bar for locking the windshield in its closed position upon said body parts, and means for swinging said windshield into open position after initially releasing said locking means.

5. In combination with the parts of an automobile body providing a windshield opening, a one piece upwardly and rearwardly inclined V-shaped type of windshield having marginal parts engaged with said body parts when in a closed position, means providing a hollow center bar for said windshield, a locking rod arranged in said center bar, means carried by the body for engagement by said bar to lock the windshield in its closed position, means for swinging the windshield from said closed to an open position, and means associated with said rod and operating as the said swinging means is actuated to swing the windshield into said open position, to disengage said bar from said means carried by the body and with which it normally engages.

6. In combination with the parts of an automobile body providing a windshield opening, a one piece upwardly and rearwardly inclined V-shaped type of windshield having marginal parts engaged with said body parts when in a closed position, means providing a center bar for said windshield, a locking rod mounted for movement longitudinally of the center bar, a member on the body with which said rod is normally engaged, a spring normally urging said rod out of engagement with said member so as to unlock the windshield, and means for swinging the windshield into open position, said last mentioned means normally holding the rod in its engaged position with said member when said windshield is in its closed position.

ROY F. ANDERSON.